US012719545B2

(12) United States Patent
Abu Al Haija et al.

(10) Patent No.: US 12,719,545 B2
(45) Date of Patent: Aug. 25, 2026

(54) INTERFEROMETER TECHNIQUES FOR SUBTERAHERTZ MIMO SYSTEMS

(71) Applicant: Huawei Technologies Co., Ltd., Shenzhen (CN)

(72) Inventors: Ahmad Abu Al Haija, Ottawa (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1 day.

(21) Appl. No.: 19/030,120

(22) Filed: Jan. 17, 2025

(65) Prior Publication Data

US 2025/0175233 A1 May 29, 2025

Related U.S. Application Data

(63) Continuation of application No. PCT/CN2022/106859, filed on Jul. 20, 2022.

(51) Int. Cl.

*H04B 7/06* (2006.01)
*H04B 7/0404* (2017.01)
*H04B 17/318* (2015.01)

(52) U.S. Cl.

CPC ......... *H04B 7/0628* (2013.01); *H04B 7/0404* (2013.01); *H04B 17/318* (2015.01)

(58) Field of Classification Search

CPC .... H04B 17/345; H04B 7/0413; H04B 7/024; H04B 7/0626; H04B 17/318; H04B 7/0404; G01S 13/42; G01S 5/0294

See application file for complete search history.

(56) References Cited

U.S. PATENT DOCUMENTS 6,362,782 B1 * 3/2002 Greenspan .............. G01S 19/22 342/453
12,273,848 B2 * 4/2025 Shpak ....................... G01S 3/50
(Continued)

FOREIGN PATENT DOCUMENTS

CN 108872933 A 11/2018
EP 3691140 A1 8/2020
(Continued)

OTHER PUBLICATIONS

Koelpin, Alexander et al., "Six-Port Based Interferometry for Precise Radar and Sensing Applications," Sensors 2016, 16, 1556, Sep. 22, 2016, 26 pages.

(Continued)

*Primary Examiner* — Sophia Vlahos
(74) *Attorney, Agent, or Firm* — Slater Matsil, LLP

(57) ABSTRACT

Techniques of using interferometry for sensing movement of an object in a communications network operating at high frequency are provided. The distance between slits does not need to be large to achieve high resolution due to the short wavelength (λ) at high frequency. Therefore, considering multi-panel, or multi-portion panel transmission, the distance between panels, or portions of a panel, may be sufficient to achieve high accuracy, even considering the case of the single panel that is virtually divided into two or more subpanels by controlling the phase shifts in each subpanel. Methods of signaling associated with an over-the-air (OTA) interferometer between a transmitter and receiver for measuring movement of an object are provided.

20 Claims, 11 Drawing Sheets

(56) References Cited

U.S. PATENT DOCUMENTS

| | | | | |
|---|---|---|---|---|
| 2019/0379434 | A1 | 12/2019 | Lindskog | |
| 2021/0357907 | A1 * | 11/2021 | Shpak | H04W 4/029 |

FOREIGN PATENT DOCUMENTS

| | | | |
|---|---|---|---|
| JP | 2015082731 | A | 4/2015 |
| WO | 2021257540 | A1 | 12/2021 |
| WO | 2022047773 | A1 | 3/2022 |

OTHER PUBLICATIONS

Kusy, Branislav et al., "Radio Interferometric Tracking of Mobile Wireless Nodes," MobiSys '07: Proceedings of the 5th International Conference on Mobile Systems, Applications and Services, Jun. 13, 2007, pp. 139-151.

Szilvasi, Sandor et al., "Interferometry in Wireless Sensor Networks," Interferometry—Research and Applications in Science and Technology, Mar. 21, 2012, pp. 437-462.

* cited by examiner

INTERFEROMETER TECHNIQUES FOR SUBTERAHERTZ MIMO SYSTEMS

CROSS REFERENCE

The present application is a continuation of International Application No. PCT/CN2022/106859, filed on Jul. 20, 2022, the disclosure of which is hereby incorporated by reference in its entirety.

TECHNICAL FIELD

The present disclosure relates generally to wireless communications, and in particular embodiments, sensing via interferometer techniques at sub-Terahertz (sub-THz) MIMO systems in a wireless communication system.

BACKGROUND

An interferometer may be used to compare two signals (in terms of phase, frequency, strength) by adding a phase shift to one of the signals to create an interference pattern that can be utilized to determine a phase difference between the signals.

FIG. 1 illustrates the well-known Young's two-slit experiment 25 where a wavefront 10 from a light source 5 passes through two parallel and adjacent slits 15*a*, 15*b* and an interference pattern of combined waves passing through the adjacent slits 15*a*, 15*b* is projected on a surface 20. The interference pattern fluctuates in amplitude depending on whether the two waves add constructively or destructively. The distance (Δ) between two peaks in amplitude of the interference pattern, which is a period between two light or dark stripes of the pattern, depends on the frequency, or wavelength λ of the source, the distance (d) between the slits 15*a*, 15*b* and the distance (D) between the plane on which the slits 15*a*, 15*b* are located and the surface 20 on which the interference pattern is projected. This distance (Δ) between peaks, may be approximated as:

$$\Delta \approx D\lambda/d.$$

Hence, a phase value between two waves from different slits may be mapped to a distance over which movement of the interference pattern is seen to occur. Note that Δ corresponds to an ambiguity range or ambiguity period. Within this range or period, movement can be detected without ambiguity as to whether the movement is more than an amount greater than the ambiguity range. If the movement is greater than the ambiguity range, it cannot be determined if it is one, two or more times larger than the ambiguity range.

In a particular example, where the frequency of the signal is f=300 GHz, i.e. the wavelength is λ=1 mm, with d=25 cm and D=10 m, then the ambiguity range is Δ=40 mm. Assuming that sensitivity to measure a phase difference between two waves is 36 degrees, the detection accuracy (or resolution) is Dλ/(10d), which is equal to 4 mm in this example. That is equivalent to an angular resolution of 0.0004 rad=0.023 degrees for a source and a detector panel separated by 10 m. Performing measurements with this angular sensitivity requires a beam width lower than 0.0002 rad in each direction=$4e^{-8}$ steradian. In order to have a beam width of this size would require over 100 million antenna elements, thereby resulting in a panel that includes $10^4 \times 10^4$ elements and having an overall size of $5\times5$ $m^2$.

An interferometer may be used to track the relative distance between nodes in a network as well as movement of one or more nodes. For example, two separate transmitters each send signals with different phase shifts and frequencies in different time slots and one or more receivers measure the received signals and feed the measurements back to the transmitters. The transmitters may use the fed back measurements to estimate the relative distances between the nodes. However, such methods require synchronization at the transmitter and receivers.

Beam sweeping may help estimate the movement based on the direction of the beams. However, the beams need to be narrow for small movements, which requires more antenna elements and hence larger antenna arrays or panels, which leads to large overhead.

Doppler shift measurements may help estimate the movement from frequency shift due to Doppler shift impact. However, such measurements may help estimate radial movement of an object, but not angular movement. Angular movement pertains to the scenario when the UE or object movement is perpendicular to a straight line between the transmitter and the UE or object. Radial movement pertains to the scenario when the UE or object movement is in the same direction as a straight line between the transmitter and the UE or object.

As can be seen above, while an interferometer may be used for determining movement there are drawbacks to existing methods that if the drawbacks could be addressed may improve performance.

SUMMARY

As described above, two separate transmitters may be used to each send signals with different phase shifts and frequencies in different time slots and one or more receivers measure the received signals and feed the measurements back to the transmitters. Aspects of the present disclosure are different than a two transmitter scenario as only a single transmitter is used in aspects of the present disclosure. In the scenario of a single transmitter with multiple panels or portions of panels, transmission among different panels or portions of panels is synchronized as the panels may be connected to a single radio frequency (RF) chain with a single local control oscillator feeding the panels.

According to an aspect of the disclosure, there is provided a method involving: receiving, by a user equipment (UE), first configuration information including information pertaining to reference signals used during interferometric measurement; measuring, by the UE, signal strength of reference signals in a plurality of time slots based on the first configuration information, wherein the reference signal transmitted from at least a portion of an antenna panel of a base station in each of the plurality of time slots has a different phase value as compared to the reference signal transmitted from at least one other portion of the antenna panel of the base station or a portion of another antenna panel of the base station in each of the plurality of time slots; and sending, by the UE, feedback information based on measurements made during the plurality of time slots.

In some embodiments, the method further comprises communicating with the base station, by the UE, second configuration information including antenna panel information pertaining to at least one of the base station or the UE.

In some embodiments, communicating with the base station involves the UE: transmitting second configuration information to the base station; or receiving second configuration information from the base station.

In some embodiments, the method further involves the UE performing interferometric measurement of the reference signals in each of the plurality of time slots by performing the measurements on receive beams at the UE over a plurality of sub-time slots in each of the plurality of time slots, wherein the plurality of sub-time slots each have a different phase value for at least a portion of an antenna panel at the UE as compared to at least one other portion of the antenna panel or a portion of another antenna panel at the UE.

In some embodiments, measuring the reference signals in a plurality of time slots involves: partitioning each of the plurality of time slots into the plurality of sub-time slots; and measuring on at least two receive beams at the UE, the reference signals in the plurality of sub-time slots based on at least one of the first and second configuration information.

In some embodiments, the second configuration information involves at least one of: an indication of antenna panels to be used at the base station for transmission of reference signals; an indication of antenna panels to be used at the UE for the interferometric measurement, and an indication of how a single antenna panel of at least one of the base station or UE is partitioned into antenna sub-panels such that the interferometric measurement is performed using the partitioned antenna sub-panels.

In some embodiments, the first configuration information involves at least one of: a number of time slots in the plurality of time slots; a duration of time slot length; a number of time slots in the plurality of sub-time slots; a duration of sub-time slot length; an indication that reference signals of at least two frequencies are used for the interferometric measurement; an indication of the at least two frequencies that are to be used for the interferometric measurement; an indication of a phase value added to antennas in one panel or panel portion in different time slots and sub-time slots in comparison to phases of antennas of the other panels or panel portions; an indication of beamwidths of the panels through which the reference signal is transmitted or received; an indication of information that the UE is to feedback; and an indication of whether beam sweeping is to be used at the UE.

In some embodiments, the indication of information that the UE is to feedback involves at least one of an indication of: an amplitude of signals received at each receive antenna panel when the antenna panels are connected to different radio frequency (RF) chains; a phase difference of signals received at different receive antenna panels; or for each time slot, an indication of a combination of measurements made at the UE in each sub-time slot of the time slot.

In some embodiments, reference signals of a first frequency are transmitted and measured at a first time-frequency resource and reference signals of a second frequency are transmitted and measured at a second time-frequency resource, and a difference of the measurements is used to reduce ambiguity by increasing an ambiguity period.

In some embodiments, two antenna panels or portions of antenna panels are arranged with respect to one another in a first direction and two antenna panels or portions of antenna panels are arranged with respect to one another in a second direction, wherein the first and second directions are perpendicular to one another, enable determining movement of an object in two directions.

In some embodiments, the UE is measuring a reflection of the reference signal off of the object in the plurality of time slots thereby determining movement of the object.

In some embodiments, the object is at least one of: the UE; or an object other than the UE that the UE is monitoring the reflected version of the reference signals in the plurality of time slots.

In some embodiments, the antenna panels are active antenna panels, passive antenna panels or a hybrid combination of active and passive antenna panels.

In some embodiments, the method further involves receiving a synchronization signal from the base station to enable the base station and the UE to be synchronized.

In some embodiments, the method further involves transmitting, by the UE, third configuration information for use in selecting an amount of ambiguity and resolution for interferometric measurement.

In some embodiments, the third configuration information involves at least one of: a number of antenna panels at the UE; at least one of UE or antenna panels orientation with respect to a reference point; UE antenna panel size; UE antenna panel shape; a number of UE antennas; a distance between UE antenna panels; and an indication of whether UE antenna panels are connected to one or more than one RF chain.

According to an aspect of the disclosure, there is provided a device including a processor and a computer-readable storage media. The computer-readable storage media has stored thereon, computer executable instructions, that when executed by the processor, perform a method as described above or detailed below.

According to an aspect of the disclosure, there is provided a method involving: transmitting, by a base station, first configuration information including information pertaining to reference signals used during interferometric measurement; transmitting, by the base station, reference signals in a plurality of time slots based at least in part on the first configuration information, wherein the reference signal transmitted from at least a portion of an antenna panel in each of the plurality of time slots has a different phase value as compared to the reference signal transmitted from at least one other portion of the antenna panel or a portion of another antenna panel in each of the plurality of time slots; receiving, by the base station, feedback information based on measurements of signal strength of the reference signals in a plurality of time slots based on the first configuration information; and determining, by the base station, an amount of movement of an object based on the feedback information.

In some embodiments, the method further comprises communicating with a UE, by the base station, second configuration information including antenna panel information pertaining to at least one of the base station or the UE.

In some embodiments, communicating with the UE involves the base station: transmitting second configuration information to the UE; or receiving second configuration information from the UE.

In some embodiments, the feedback information involves the interferometric measurement of the reference signals in each of the plurality of time slots in which the measurements are made using receive beams at the UE over a plurality of sub-time slots in each of the plurality of time slots, wherein the plurality of sub-time slots each have a different phase value for at least a portion of an antenna panel as compared to at least one other portion of the antenna panel or a portion of another antenna panel at the UE.

In some embodiments, the second configuration information involves at least one of: an indication of antenna panels to be used at the base station for the interferometric measurement; an indication of antenna panels to be used at the UE for the interferometric measurement; and an indication of how a single antenna panel of at least one of the base station or UE is partitioned into antenna sub-panels such that the interferometric measurement is performed using the partitioned antenna sub-panels.

In some embodiments, wherein the first configuration information involves at least one of: a number of time slots in the plurality of time slots; a duration of time slot length; a number of time slots in the plurality of sub-time slots; a duration of sub-time slot length; an indication that reference signals of at least two frequencies are used for the interferometric measurement; an indication of the at least two frequencies that are to be used for the interferometric measurement; an indication of a phase value added to antennas in one panel or panel portion in different time slots and sub-time slots in comparison to phases of antennas of the other panels or panel portions; an indication of beam-widths of panels through which the reference signal is transmitted or received; an indication of information that the UE is to feedback; and an indication of whether beam sweeping is to be used at the UE.

In some embodiments, the indication of information that the UE is to feedback involves at least one of an indication of: an amplitude of signals received at each receive antenna panel when the antenna panels are connected to different RF chains; a phase difference of signals received at different receive antenna panels; or for each time slot, an indication of a combination of measurements made at the UE in each sub-time slot of the time slot.

In some embodiments, reference signals of a first frequency are transmitted and measured at a first time-frequency resource and reference signals of a second frequency are transmitted and measured at a second time-frequency resource, and a difference of the measurements is used to reduce ambiguity by increasing an ambiguity period.

In some embodiments, two antenna panels or portions of antenna panels are arranged with respect to one another in a first direction and two antenna panels or portions of antenna panels are arranged with respect to one another in a second direction, wherein the first and second directions are perpendicular to one another, that enables determining movement of the object in two directions.

In some embodiments, the object is at least one of: the UE; or an object other than the UE that the UE is monitoring a reflected version of the reference signals in the plurality of time slots.

In some embodiments, the antenna panels are active antenna panels, passive antenna panels or a hybrid combination of active and passive antenna panels.

In some embodiments, the method further involves transmitting a synchronization signal to the UE to enable the base station and the UE to be synchronized.

In some embodiments, the method further involves receiving, by the base station, third configuration information for use in selecting an amount of ambiguity and resolution for interferometric measurement.

In some embodiments, the third configuration information involves at least one of: a number of antenna panels at the UE; at least one of UE or antenna panels orientation with respect to a reference point; UE antenna panel size; UE antenna panel shape; a number of UE antennas; a distance between UE antenna panels; and an indication of whether UE antenna panels are connected to one or more than one RF chain.

According to an aspect of the disclosure, there is provided a device including a processor and a computer-readable storage media. The computer-readable storage media has stored thereon, computer executable instructions, that when executed by the processor, perform a method as described above or detailed below.

According to an aspect of the disclosure, there is provided a method involving: receiving, by a UE, first configuration information including information pertaining to reference signals used during interferometric measurement; transmitting, by the UE, reference signals in a plurality of time slots based at least in part on the first configuration information, wherein the reference signal transmitted from at least a portion of an antenna panel in each of the plurality of time slots has a different phase value as compared to the reference signal transmitted from at least one other portion of the antenna panel or a portion of another antenna panel in each of the plurality of time slots.

In some embodiments, the method further comprises communicating with the base station, by the UE, second configuration information including antenna panel information pertaining to at least one of the base station or the UE.

In some embodiments, communicating with the base station involves the UE: transmitting second configuration information to the base station; or receiving second configuration information from the base station.

In some embodiments, the second configuration information involves at least one of: an indication of antenna panels to be used at the base station for the interferometric measurement; an indication of antenna panels to be used at the UE for the interferometric measurement, and an indication of how a single antenna panel of at least one of the base station or UE is partitioned into antenna sub-panels such that the interferometric measurement is performed using the partitioned antenna sub-panels.

In some embodiments, the first configuration information involves at least one of: a number of time slots in the plurality of time slots; a duration of time slot length; a number of time slots in the plurality of sub-time slots; a duration of sub-time slot length; an indication that reference signals of at least two frequencies are used for the interferometric measurement; an indication of the at least two frequencies that are to be used for the interferometric measurement; an indication of a phase value added to antennas in one panel or panel portion in different time slots and sub-time slots in comparison to phases of antennas of the other panels or panel portions; and an indication of beam-widths of panels through which the reference signal is transmitted or received.

In some embodiments, reference signals of a first frequency are transmitted at a first time-frequency resource and reference signals of a second frequency are transmitted at a second time-frequency resource, and a difference of the measurements is used to reduce ambiguity by increasing an ambiguity period.

In some embodiments, two antenna panels or portions of antenna panels are arranged with respect to one another in a first direction and two antenna panels or portions of antenna panels are arranged with respect to one another in a second direction, wherein the first and second directions are perpendicular to one another, enable finding movement of an object in two directions.

In some embodiments, the antenna panels are active antenna panels, passive antenna panels or a hybrid combination of active and passive antenna panels.

In some embodiments, the method further involves receiving a synchronization signal from the base station to enable the base station and the UE to be synchronized.

In some embodiments, the method further involves transmitting, by the UE, third configuration information for use in selecting an amount of ambiguity and resolution for interferometric measurement.

In some embodiments, the third configuration information involves at least one of: a number of antenna panels at the UE; at least one of UE or antenna panels orientation with respect to a reference point; UE antenna panel size; UE antenna panel shape; a number of UE antennas; a distance between UE antenna panels; and an indication of whether UE antenna panels are connected to one or more than one RF chain.

According to an aspect of the disclosure, there is provided a device including a processor and a computer-readable storage media. The computer-readable storage media has stored thereon, computer executable instructions, that when executed by the processor, perform a method as described above or detailed below.

According to an aspect of the disclosure, there is provided a method involving: transmitting, by a base station, first configuration information including information pertaining to reference signals used during interferometric measurement; measuring, by the base station, signal strength of reference signals in a plurality of time slots based on the first configuration information, wherein the reference signal transmitted from at least a portion of an antenna panel of the UE in each of the plurality of time slots has a different phase value as compared to the reference signal transmitted from at least one other portion of the antenna panel of the UE or a portion of another antenna panel from the UE in each of the plurality of time slots; determining, by the base station, an amount of movement of an object based on the measurement of the signal strength of the reference signals.

In some embodiments, the method further comprises communicating with a UE, by a base station, second configuration information including antenna panel information pertaining to at least one of the base station or the UE.

In some embodiments, communicating with the UE involves the base station: transmitting second configuration information to the UE; or receiving second configuration information from the UE.

In some embodiments, the method further involves the base station performing interferometric measurement of the reference signals in each of the plurality of time slots by performing the measurements on receive beams at the base station over a plurality of sub-time slots in each of the plurality of time slots, wherein the plurality of sub-time slots each have a different phase value for at least a portion of an antenna panel at the base station as compared to at least one other portion of the antenna panel or a portion of another antenna panel at the base station.

In some embodiments, measuring the reference signals in a plurality of time slots involves: partitioning each of the plurality of time slots into the plurality of sub-time slots; and measuring on at least two receive beams at the base station, the reference signals in the plurality of sub-time slots based on at least one of the first and second configuration information.

In some embodiments, the object is at least one of: the UE; or an object other than the UE that the base station is monitoring a reflected version of the reference signals in the plurality of time slots.

In some embodiments, the base station is measuring a reflection of the reference signal off of the object in the plurality of time slots thereby determining movement of the object.

In some embodiments, the second configuration information involves at least one of: an indication of antenna panels to be used at the base station for the interferometric measurement; an indication of antenna panels to be used at the UE for the interferometric measurement; and an indication of how a single antenna panel of at least one of the base station or UE is partitioned into antenna sub-panels such that the interferometric measurement is performed using the partitioned antenna sub-panels.

In some embodiments, the first configuration information involves at least one of: a number of time slots in the plurality of time slots; a duration of time slot length; a number of time slots in the plurality of sub-time slots. a duration of sub-time slot length; an indication that reference signals of at least two frequencies are used for the interferometric measurement; an indication of the at least two frequencies that are to be used for the interferometric measurement; an indication of a phase value added to antennas in one panel or panel portion in different time slots and sub-time slots in comparison to phases of antennas of the other panels or panel portions; and an indication of beam-widths of panels through which the reference signal is transmitted or received.

In some embodiments, reference signals of a first frequency are measured at a first time-frequency resource and reference signals of a second frequency are measured at a second time-frequency resource, and a difference of the measurements is used to reduce ambiguity by increasing an ambiguity period.

In some embodiments, two antenna panels or portions of antenna panels are arranged with respect to one another in a first direction and two antenna panels or portions of antenna panels are arranged with respect to one another in a second direction, wherein the first and second directions are perpendicular to one another, that enables finding movement of the object in two directions.

In some embodiments, the antenna panels are active antenna panels, passive antenna panels or a hybrid combination of active and passive antenna panels.

In some embodiments, the method further involves transmitting a synchronization signal to the UE to enable the base station and the UE to be synchronized.

In some embodiments, the method further involves receiving, by the base station, third configuration information for use in selecting an amount of ambiguity and resolution for interferometric measurement.

In some embodiments, the third configuration information involves at least one of: a number of antenna panels at the UE; at least one of UE or antenna panels orientation with respect to a reference point; UE antenna panel size; UE antenna panel shape; a number of UE antennas; a distance between UE antenna panels; and an indication of whether UE antenna panels are connected to one or more than one RF chain.

According to an aspect of the disclosure, there is provided a device including a processor and a computer-readable storage media. The computer-readable storage media has stored thereon, computer executable instructions, that when executed by the processor, perform a method as described above or detailed below.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION

Figure 1:
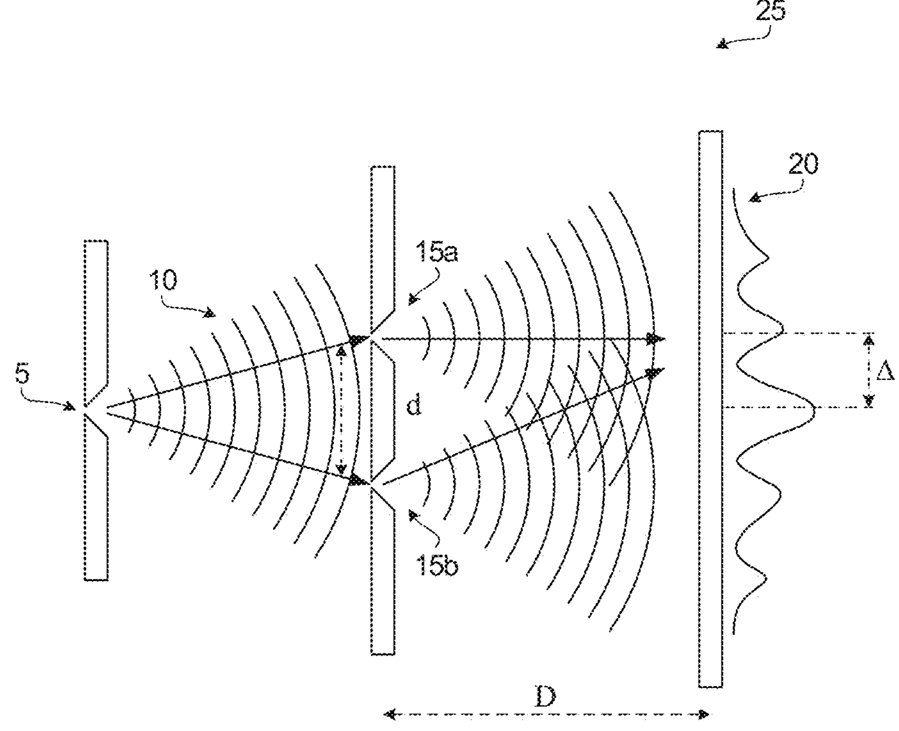
FIG. 1 is a schematic diagram of Young's two slit interference experiment.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of the disclosure may provide using interferometry for sensing movement at high frequency as the interferometer may achieve high accuracy without requiring large overhead resulting from using very narrow beams that are generated via very large panels. The distance between slits does not need to be large to achieve high resolution due to the short wavelength (λ) at high frequency. Therefore, considering multi-panel, or multi-portion panel transmission, the distance between panels, or portions of a panel, may be sufficient to achieve high accuracy, even considering the case of the single panel that is virtually divided into two or more subpanels by controlling the phase shifts in each subpanel.

Aspects of the disclosure may also provide methods of signaling associated with an over-the-air (OTA) interferometer between a transmitter and receiver for measuring movement of an object. In some embodiment, the object may be the receiver, such a UE. In some embodiments, the object may be a different element of the network that the receiver, such as a UE, may be used to aid in determining the movement of. In an uplink (UL) transmission scenario, the transmitter may be a UE or another network device capable of transmitting reference signals from multiple panels or multiple panel portions to a receiver, such as a base station, that can perform measurements to determine movement of the UE or other device. In a downlink (DL) transmission scenario, the transmitter may be a base station or another network device capable of transmitting reference signals from multiple panels or multiple panel portions to a receiver, such as a UE or sensor, that can perform measurements and feedback measurement information to the transmitter to determine movement of the UE or other device.

Figure 2A:
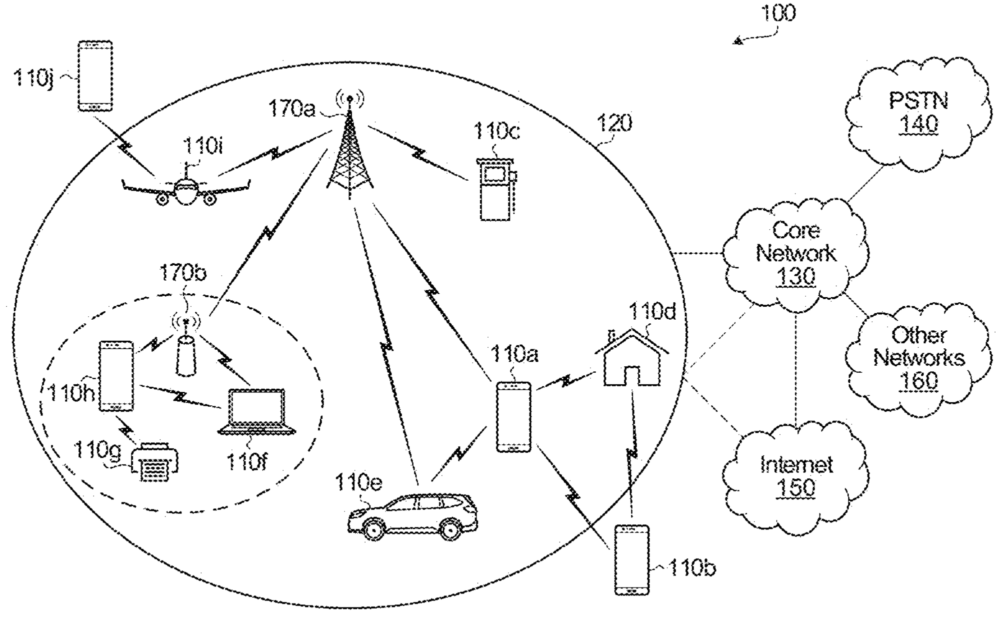
FIG. 2A is a schematic diagram of a communication system in which embodiments of the disclosure may occur.
Figure 2B:
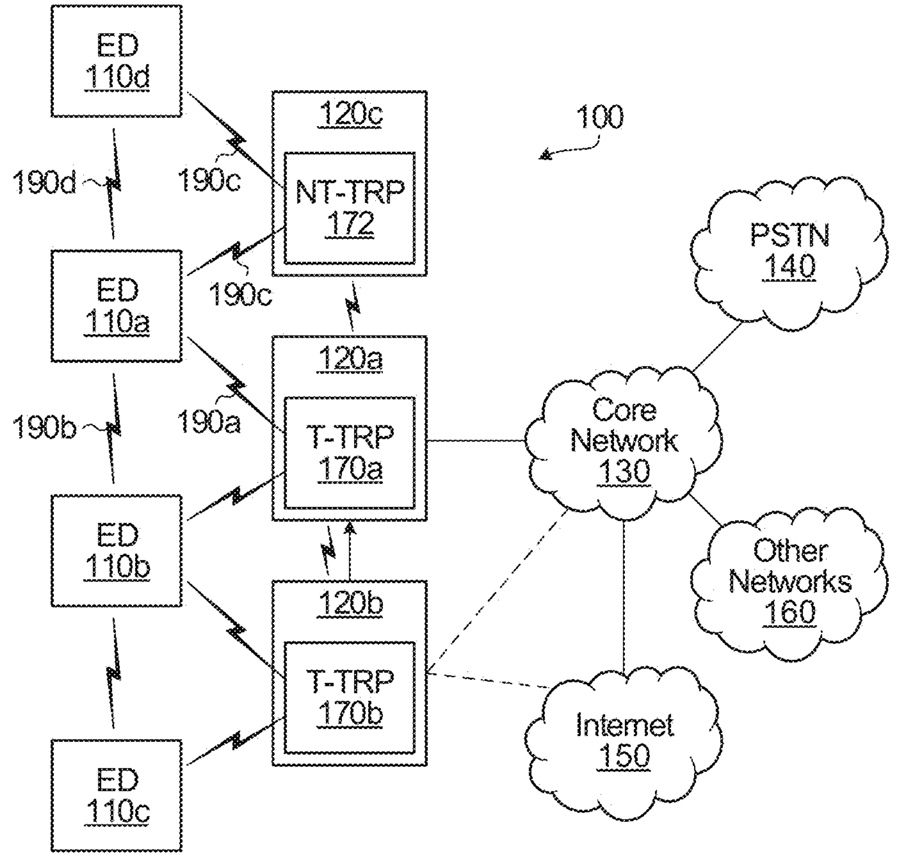
FIG. 2B is another schematic diagram of a communication system in which embodiments of the disclosure may occur.
Figure 3:
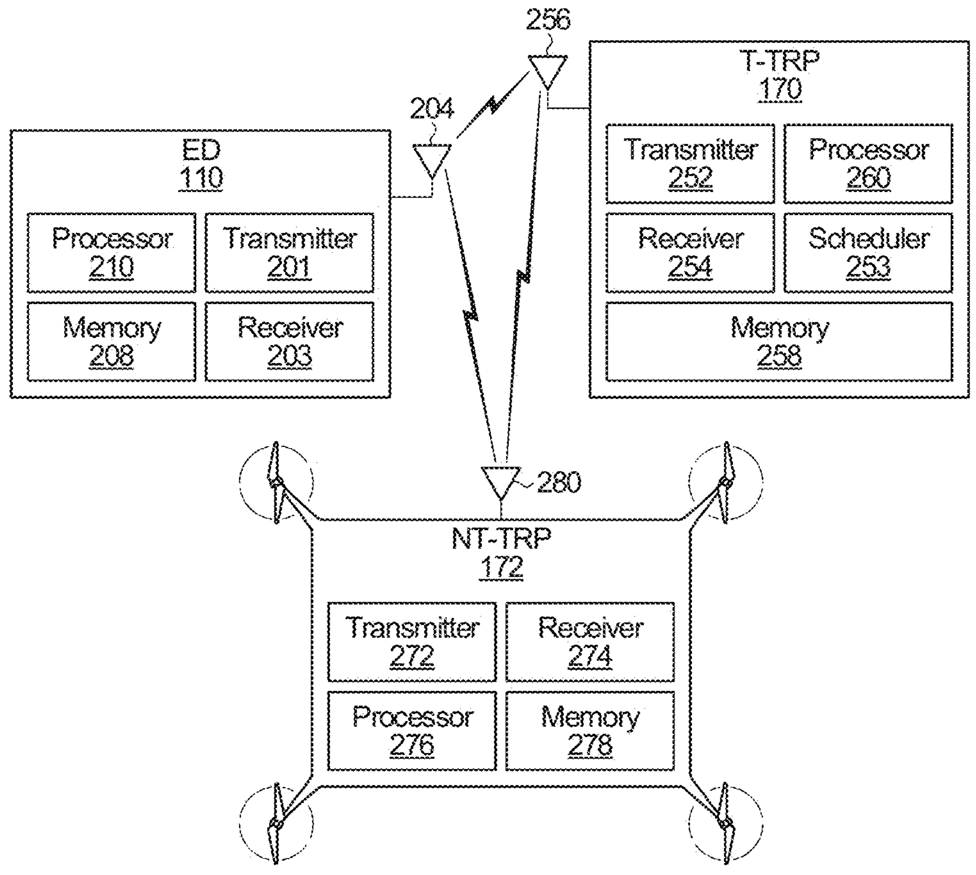
FIG. 3 is a block diagram illustrating units or modules in a device in which embodiments of the disclosure may occur.

FIGS. 2A, 2B, and 3 following below provide context for the network and device that may be in the network and that may implement aspects of the present disclosure.

Referring to FIG. 2A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110*a*-120*j* (generically referred to as 110) may be interconnected to one another, and may also or instead be connected to one or more network nodes (170*a*, 170*b*, generically referred to as 170) in the radio access network 120. A core network 130 may be a part of the communication system and may be dependent or independent of the radio access technology used in the communication system 100. Also, the communication system 100 comprises a public switched telephone network (PSTN) 140, the internet 150, and other networks 160.

FIG. 2B illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110*a*-110*c*, radio access networks (RANs) 120*a*-120*b*, a core network 130, a public switched telephone network (PSTN) 140, the Internet 150, and other networks 160. While certain numbers of these components or elements are shown in FIG. 2B, any reasonable number of these components or elements may be included in the system 100.

The EDs 110*a*-110*c* are configured to operate, communicate, or both, in the system 100. For example, the EDs 110*a*-110*c* are configured to transmit, receive, or both via wireless communication channels. Each ED 110*a*-110*c* represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 2B illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110*a*-110*d*, radio access networks (RANs) 120*a*-120*c*, a core network 130, a public switched telephone network (PSTN) 140, the internet 150, and other networks 160. Although certain numbers of these components or elements are shown in FIG. 2B, any reasonable number of these components or elements may be included in the communication system 100.

The EDs 110*a*-110*d* are configured to operate, communicate, or both, in the communication system 100. For example, the EDs 110*a*-110*d* are configured to transmit, receive, or both, via wireless or wired communication channels. Each ED 110*a*-110*d* represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 2B, the RANs 120*a*-120*b* include base stations 170*a*-170*b*, respectively. Each base station 170*a*-170*b* is configured to wirelessly interface with one or more of the EDs 110*a*-110*c* to enable access to any other base station 170*a*-170*b*, the core network 130, the PSTN 140, the internet 150, and/or the other networks 160. For example, the base stations 170*a*-170*b* may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router.

In some examples, one or more of the base stations 170*a*-170*b* may be a terrestrial base station that is attached to the ground. For example, a terrestrial base station could be mounted on a building or tower. Alternatively, one or more of the base stations 172 may be a non-terrestrial base station, or non-terrestrial TRP (NT-TRP), that is not attached to the ground. A flying base station is an example of the non-terrestrial base station. A flying base station may be implemented using communication equipment supported or carried by a flying device. Non-limiting examples of flying devices include airborne platforms (such as a blimp or an airship, for example), balloons, quadcopters and other aerial vehicles. In some implementations, a flying base station may be supported or carried by an unmanned aerial system (UAS) or an unmanned aerial vehicle (UAV), such as a drone or a quadcopter. A flying base station may be a moveable or mobile base station that can be flexibly deployed in different locations to meet network demand. A satellite base station is another example of a non-terrestrial base station. A satellite base station may be implemented using communication equipment supported or carried by a satellite. A satellite base station may also be referred to as an orbiting base station.

Any ED 110*a*-110*d* may be alternatively or additionally configured to interface, access, or communicate with any other base station 170*a*-170*b*, the internet 150, the core network 130, the PSTN 140, the other networks 160, or any combination of the preceding.

The EDs 110*a*-110*d* and base stations 170*a*-170*b*, 172 are examples of communication equipment that can be configured to implement some or all of the operations and/or embodiments described herein. In the embodiment shown in FIG. 2B, the base station 170*a* forms part of the RAN 120*a*, which may include other base stations, base station controller(s) (BSC), radio network controller(s) (RNC), relay nodes, elements, and/or devices. Any base station 170*a*, 170*b* may be a single element, as shown, or multiple elements, distributed in the corresponding RAN, or otherwise. Also, the base station 170*b* forms part of the RAN 120*b*, which may include other base stations, elements, and/or devices. Each base station 170*a*-170*b* transmits and/or receives wireless signals within a particular geographic region or area, sometimes referred to as a "cell" or "coverage area". A cell may be further divided into cell sectors, and a base station 170*a*-170*b* may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120*a*-120*b* shown is exemplary only. Any number of RAN may be contemplated when devising the communication system 100.

The base stations 170*a*-170*b*, 172 communicate with one or more of the EDs 110*a*-110*c* over one or more air interfaces 190*a*, 190*c* using wireless communication links e.g. radio frequency (RF), microwave, infrared (IR), etc. The air interfaces 190*a*, 190*c* may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a*, 190*c*.

A base station 170*a*-170*b*,172 may implement Universal Mobile Telecommunication System (UMTS) Terrestrial Radio Access (UTRA) to establish an air interface 190*a*, 190*c* using wideband CDMA (WCDMA). In doing so, the base station 170*a*-170*b*.172 may implement protocols such as High Speed Packet Access (HSPA), Evolved HPSA (HSPA+) optionally including High Speed Downlink Packet Access (HSDPA), High Speed Packet Uplink Access (HSPUA) or both. Alternatively, a base station 170*a*-170*b*, 172 may establish an air interface 190*a*,190*c* with Evolved UTMS Terrestrial Radio Access (E-UTRA) using LTE, LTE-A, and/or LTE-B. It is contemplated that the communication system 100 may use multiple channel access operation, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120*a*-120*b* are in communication with the core network 130 to provide the EDs 110*a*-110*c* with various services such as voice, data, and other services. The RANs 120*a*-120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a*-120*b* or EDs 110*a*-110*c* or both, and (ii) other networks (such as the PSTN 140, the internet 150, and the other networks 160).

The EDs 110*a*-110*d* communicate with one another over one or more sidelink (SL) air interfaces 190*b*, 190*d* using wireless communication links e.g. radio frequency (RF), microwave, infrared (IR), etc. The SL air interfaces 190*b*, 190*d* may utilize any suitable radio access technology, and may be substantially similar to the air interfaces 190*a*, 190*c* over which the EDs 110*a*-110*c* communication with one or more of the base stations 170*a*-170*b*, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 190*b*, 190*d*. In some embodiments, the SL air interfaces 180 may be, at least in part, implemented over unlicensed spectrum.

In addition, some or all of the EDs 110*a*-110*d* may include operation for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110*a*-110*d* may be multimode devices capable of operation according to multiple radio access technologies, and incorporate multiple transceivers necessary to support multiple radio access technologies.

In some embodiments, the signal is transmitted from a terrestrial BS to the UE or transmitted from the UE directly to the terrestrial BS and in both cases the signal is not reflected by a RIS. However, the signal may be reflected by the obstacles and reflectors such as buildings, walls and furniture. In some embodiments, the signal is communicated between the UE and a non-terrestrial BS such as a satellite, a drone and a high-altitude platform. In some embodiments, the signal is communicated between a relay and a UE or a relay and a BS or between two relays. In some embodiments, the signal is transmitted between two UEs. In some embodiments, one or multiple RIS are utilized to reflect the signal from a transmitter and a receiver, where any of the transmitter and receiver includes UEs, terrestrial or non-terrestrial BS, and relays.

FIG. 3 illustrates another example of an ED 110 and network devices, including a base station 170*a*, 170*b* (at 170) and an NT-TRP 172. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170*a* and 170*b* is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 2A or 2B). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 210 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distributed unit (DU), positioning node, among other possibilities. The T-TRP 170 may be macro BSs, pico BSs, relay node, donor node, or the like, or combinations thereof. The T-TRP 170 may refer to the forging devices, or to apparatus (e.g. communication module, modem, or chip) in the forgoing devices. While the figures and accompanying description of example and embodiments of the disclosure generally use the terms AP, BS, and AP or BS, it is to be understood that such device could be any of the types described above.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. multiple-input multiple-output (MIMO) precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

One or more steps of the embodiment methods provided herein may be performed by corresponding units or modules, according to FIG. 3. FIG. 3 illustrates units or modules in a device, such as in ED 110, in T-TRP 170, or in NT-TRP 172. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Figure 4:
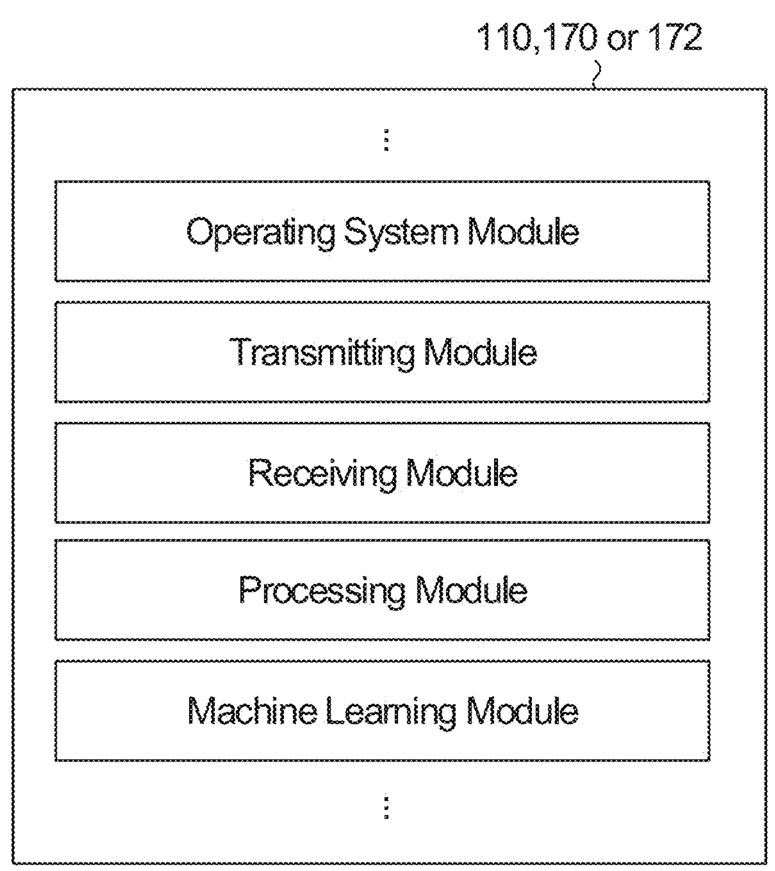
FIG. 4 is a block diagram illustrating units or modules in a device in which embodiments of the disclosure may occur.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

For future wireless networks, a number of the new devices could increase exponentially with diverse functionalities. Also, many new applications and new use cases in future wireless networks than existing in 5G may emerge with more diverse quality of service demands. These will result in new key performance indications (KPIs) for the future wireless network (for an example, 6G network) that can be extremely challenging, so the sensing technologies, and AI technologies, especially ML (deep learning) technologies, had been introduced to telecommunication for improving the system performance and efficiency.

AI/ML technologies applied communication including AI/ML communication in Physical layer and AI/ML communication in media access control (MAC) layer. For physical layer, the AI/ML communication may be useful to optimize the components design and improve the algorithm performance, like AI/ML on channel coding, channel modelling, channel estimation, channel decoding, modulation, demodulation, MIMO, waveform, multiple access, PHY element parameter optimization and update, beam forming & tracking and sensing & positioning, etc. For MAC layer, AI/ML communication may utilize the AI/ML capability with learning, prediction and make decisions to solve the complicated optimization problems with better strategy and optimal solution, for example to optimize the functionality in MAC, e.g. intelligent TRP management, intelligent beam management, intelligent channel resource allocation, intelligent power control, intelligent spectrum utilization, intelligent modulation and coding scheme (MCS), intelligent hybrid automatic repeat request (HARQ) strategy, intelligent transmit/receive (Tx/Rx) mode adaption, etc.

AI/ML architectures usually involve multiple nodes, which can be organized in two modes, i.e., centralized and distributed, both of which can be deployed in access network, core network, or an edge computing system or third-party network. The centralized training and computing architecture is restricted by huge communication overhead and strict user data privacy. Distributed training and computing architecture comprise several frameworks, e.g., distributed machine learning and federated learning. AI/ML architectures comprises intelligent controller which can perform as single agent or multi-agent, based on joint optimization or individual optimization. A new protocol and signaling mechanism is needed so that the corresponding interface link can be personalized with customized parameters to meet particular requirements while minimizing signaling overhead and maximizing the whole system spectrum efficiency by personalized AI technologies.

Further terrestrial and non-terrestrial networks can enable a new range of services and applications such as earth monitoring, remote sensing, passive sensing and positioning, navigation, and tracking, autonomous delivery and mobility. Terrestrial networks based sensing and non-terrestrial networks based sensing could provide intelligent context-aware networks to enhance the UE experience. For example, terrestrial networks based sensing and non-terrestrial networks based sensing may involve opportunities for localization and sensing applications based on a new set of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further in terrestrial and non-terrestrial networks, the measured channel data and sensing and positioning data can be obtained by the large bandwidth, new spectrum, dense network and more light-of-sight (LOS) links. Based on these data, a radio environmental map can be drawn through AI/ML methods, where channel information is linked to its corresponding positioning or environmental information to provide an enhanced physical layer design based on this map.

Sensing coordinators are nodes in a network that can assist in the sensing operation. These nodes can be standalone nodes dedicated to just sensing operations or other nodes (for example TRP 170, ED 110, or core network node) doing the sensing operations in parallel with communication transmissions. A new protocol and signaling mechanism is needed so that the corresponding interface link can be performed with customized parameters to meet particular requirements while minimizing signaling overhead and maximizing the whole system spectrum efficiency.

AI/ML and sensing methods are data-hungry. In order to involve AI/ML and sensing in wireless communications, more and more data are needed to be collected, stored, and exchanged. The characteristics of wireless data expand quite large ranges in multiple dimensions, e.g., from sub-6 GHz, millimeter to Terahertz carrier frequency, from space, outdoor to indoor scenario, and from text, voice to video. These data collecting, processing and usage operations are performed in a unified framework or a different framework.

Aspects of the present disclosure provide a method and devices for detecting or sensing a small movement with a resolution of a range of millimeter (mm) or even sub millimeter of an active device (e.g. UE), or of a passive object, using interferometer technology.

Figure 5:
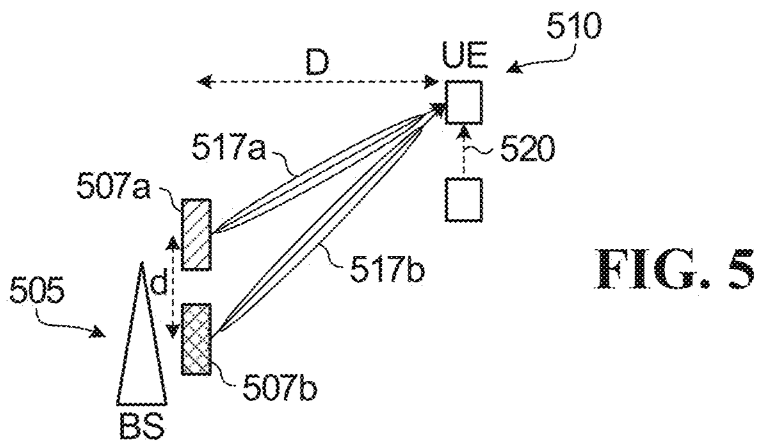
FIG. 5 is a block diagram illustrating a network in which two panels at a base station separated by a distance d are used to transmit reference signals that are measured at a user equipment (UE) and fed back to the base station to determine movement of the UE according to an aspect of the present disclosure.

FIG. 5 illustrates a portion of a network that includes a base station (BS) 505 with multiple panels 507*a* and 507*b*, and a UE 510. These multiple panels may be separate panels connected to the same RF chain or multiple portions, or sub-panels, of a single panel that has been virtually partitioned. The base station 505 aims to estimate movement of the UE 510 by implementing interferometry. For example, the base station 505 sends a reference signal over multiple time slots. The signal is sent from the two panels (or sub-panels) 507*a* and 507*b*, on two beams 517*a* and 517*b* that transmit the same signal, but with an additional phase shift for the antenna elements of one panel of the two panels (or sub-panels of a single panel) in each time slot. The UE

510 measures the received signal strength in each time slot and feeds back measurement information to the base station 505. The base station 505 utilizes the feedback measurements to estimate the movement of the UE 510 (movement direction indicated by the arrow 520 in FIG. 5) based on the feedback information from the UE 510.

Some embodiments provide a method to resolve ambiguity that may be associated with using interferometry at high frequencies. Therefore, some methods may employ interferometry at both the transmitter and the receiver (i.e. a double-side interferometer) as shown in FIG. 6.

Figure 6:
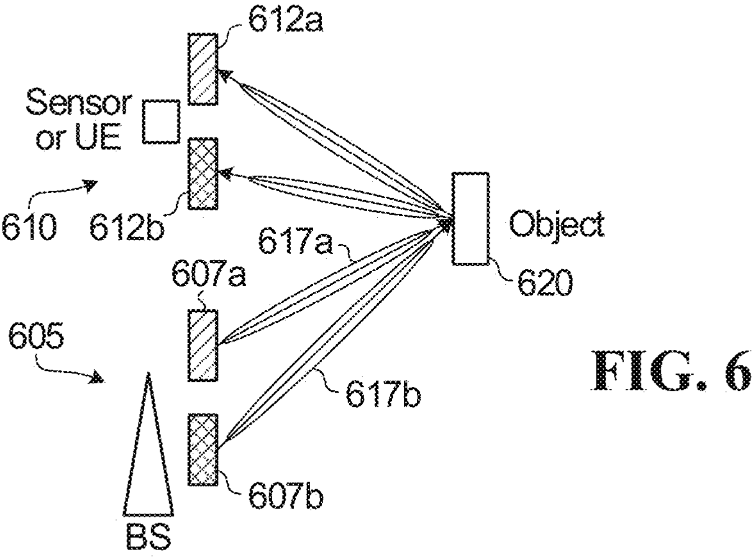
FIG. 6 is a block diagram illustrating a network in which two panels at a base station that are spaced apart transmit reference signals toward an object and two panels at a UE or sensor that are spaced part detect a reflection of the reference signals off of the object in order to determine movement of the object according to an aspect of the present disclosure.

FIG. 6 illustrates a portion of a network that includes a base station 605 with multiple panels 607*a* and 607*b*, an object 620, and a UE. or sensor. 610 with multiple panels 612*a* and 612*b*. In both the case of the base station 605 and the UE or sensor 610, these multiple panels may be separate panels connected to the same RF chain or multiple portions, or sub-panels, of a single panel that has been virtually partitioned. The base station 605 sends a reference signal in a direction of the object 620 over multiple time slots. The signal is sent from the two panels 607*a* and 607*b*, on two beams 617*a* and 617*b* that transmit the same signal, but with additional phase shifts for the antenna elements of one panel, or sub-panel, in each time slot. The UE or sensor 610 receives the reference signal at panels 612*a* and 612*b* and measures a reflection of the signal off of the object 620 in each sub-time slot of each of the multiple time slots. The UE 610 uses two receive beams from panels 612*a* and 612*b* to measure the reflected receive signal strength in each sub-time slot and feeds back measurement information to the base station 605, which utilizes the feedback measurements to estimate the movement of the object 620 based on the phase difference of the feedback information of the UE 610.

While FIGS. 5 and 6 show the base station transmitting reference signals and the UE receiving the reference signals, or reflection of the reference signals, for a downlink (DL) directionality it should be understood that in alternative embodiments the UE could transmit the reference signal and the base station receiving the reference signals, or reflection of the reference signals for an uplink (UL) directionality. Furthermore, either the base station or the UE, or both, could use two antenna panels, or virtually partitioned portions of a single panel. For example, in the UL direction, the UE sends reference signals via two panels in multiple time slots with different phases added for one or both panels in different time slots. The base station, with one panel, performs measurements and feeds back measurement information to the UE to help the base station determine movement of the UE. In the DL direction, the base station sends the reference signals and the UE receives via two beams from different panel and applies receive interferometry. Alternatively, in the DL direction, the base station can virtually divide a base station antenna panel into two parts and perform transmit side interferometry while the UE performs receive side interferometry thereby acting overall as a double-sided interferometer.

Embodiments that employ the double-sided interferometer may reduce the total ambiguity by having a larger ambiguity period, while also improving accuracy of the amount of movement.

Being able to detect movement using an OTA interferometer as described in various embodiments of this disclosure may have implications for industries with large amounts of automation. For example, a robot may use interferometry related methods as described herein to find objects on shelves and carefully move the objects to another location. Another application may be related to motion detection. For example, lights turning on when there is movement in the room.

Some embodiments provide a system capable of integrated sensing and communication for applications at high frequencies in which a transmitter and/or a receiver are equipped with one or more panels, in which each panel has multiple elements. For example, the elements may be antenna elements on a transmitter or receiver or RIS elements on a sensor.

Referring again to FIG. 5, it can be seen that the base station 505 has two panels 507*a* and 507*b* with the distance between the panels equal to d. Once again it should be noted that these two panels shown in FIG. 5 may be separate panels or a single panel that has been virtually partitioned into sub-panel portions. The UE 510 is located at a distance equal to D in front of the base station 505. Hence, the ambiguity range is expressed in integer multiples of DA/d.

The base station 505 may estimate a phase difference using the UE measurement feedback with a sensitivity of x degrees phase difference. For example, if x=10 degrees, the base station 505 may estimate a quantized phase value from a set of values {10, 20, 30, . . . , 360}, where each value in the set is expressed in degrees. Therefore, detection resolution may be considered to be equal to $xD\lambda/360d$.

Figure 7:
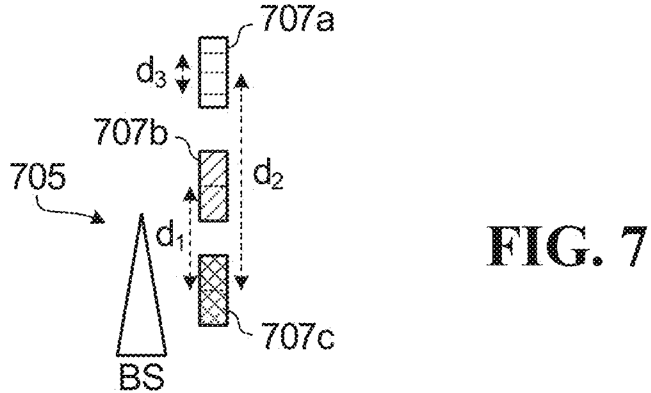
FIG. 7 is a schematic diagram illustrating how three separate panels or panel portions that are spaced apart from one another may be used to determine movement of an object according to an aspect of the present disclosure.

In some embodiments, the detection resolution may be controlled by changing the value of d. Changing the value of d, may be performed by selecting the appropriate antenna panels, or sub-panel portions of a single panel. For example, FIG. 7 shows an example base station 705 having three panels, a top panel 707*a*, a middle panel 707*b* and a bottom panel 707*c*. In FIG. 7, the distance $d_2$ between the top panel 707*a* and the bottom panel 707*c* is larger than the distance $d_1$ between the middle panel 707*b* and the bottom panel 707*c*. This concept may be implemented using one panel, in which the panel is virtual partitioned into multiple portions, or using multiple discrete panels. While only three panels are shown in FIG. 7 it is to be understood that the base station 705 may have more than three panels, or may be a single panel partitioned into more than three portions, or may be two or more panels in which one or more panels is partitioned into two or more panels. Therefore, in some embodiments, depending on the ambiguity period and resolution expectations, the base station selects which two or more panels, or sub-panels, to use for the interferometer method. Antenna elements of the same panel, or antenna elements of different panels, may be connected to the same RF chain and same local control oscillator (LCO).

In some embodiments, the base station 707 may virtually partition a single panel into two or more portions and apply embodiments of the interferometer method using the portions of the panel. For example, in FIG. 7, the virtual partitioning of the top panel 707*a* into two sub-panel portions may be achieved by changing the phase shifts of top and bottom halves of the top panel 707*a*. A distance between the two partitioned halves of the top panel 707*a* is equal to half of the overall panel length $d_3$, i.e., $d=0.5*(d_3)$.

Referring again to FIG. 5, the base station 505 transmits reference signals from the two panels 507*a* and 507*b* to the UE 505 over four time slots. The beams of the panels 507*a* and 507*b* are in the general direction to the UE 510. The two panels 507*a* and 507*b* are connected to the same RF chain and LCO. While the phases of the signal transmitted by the first panel 507*a* remain the same over the four time slot transmission, the phases of the signal transmitted by the second panel 507*b* are the same as those of the first panel in a first time slot of the four time slots, but the phases are changed in the other three time slots. For example, the phase of the transmitted signal may be increased by 0.57π in the second time slot, the phase of the transmitted signal may be increased by a in the third time slot, and the phase of the transmitted signal may be increased by 1.57π in the fourth time slot. While four slots are described in the example above, it is to be understand that a different number of slots may be used, as long as the number of slots enables the feedback information to be determined and sent back to the base station to be used appropriately.

The UE 510 measures amplitudes of the received signal with the different phase adjustment in the various time slots and then sends a feedback report to the base station 505 including measurement information.

The base station 505 utilizes the measurement information in the feedback report from the UE 510 to estimate a phase difference between the signals transmitted from both panels 507*a* and 507*b* and maps the phase difference to determine movement of the UE 510, e.g., distance the UE has moved.

In some embodiments, there may be a trade-off between ambiguity and accuracy. While the accuracy may be controlled by changing the value of d as discussed above, changing the value of d also impacts the ambiguity. Specifically, increasing the value of d improves the accuracy of the determined movement of the UE, but may increase the ambiguity by reducing the ambiguity period. Therefore, care needs to be taken when selecting the value of d to achieve specific accuracy while avoiding ambiguity as to the moved distance of the UE 510.

Figure 8:
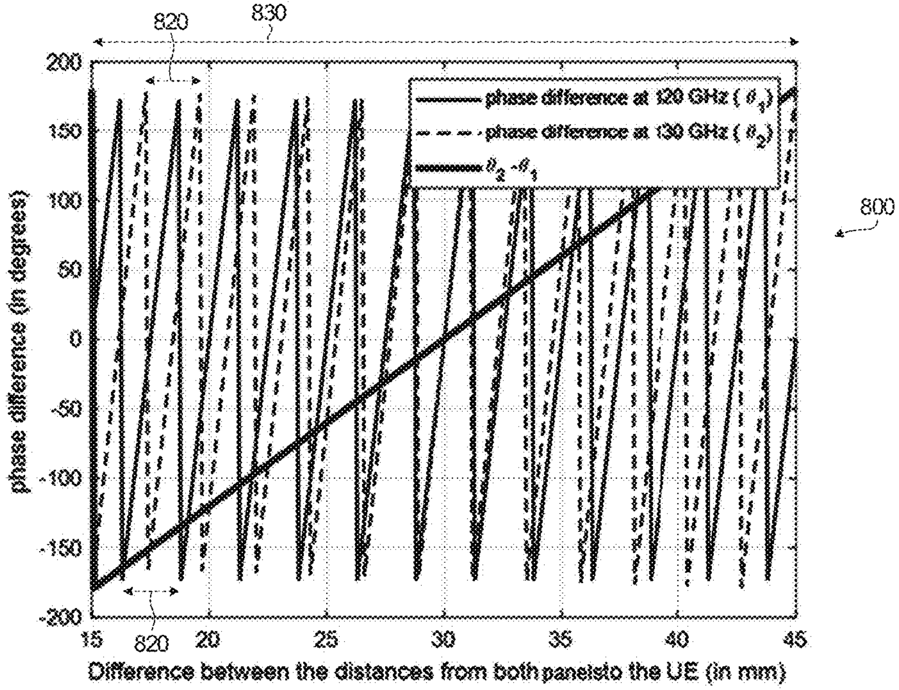
FIG. 8 is a graphical plot illustrating how the phase difference at two different frequencies may be used to enable a larger ambiguity range according to embodiments of the present disclosure.

In some embodiments, it may be possible to reduce the ambiguity by increasing the ambiguity period, while maintaining or improving the accuracy, by performing the interferometer method by transmitting reference signals with different frequencies. FIG. 8 is a graphical plot 800 that illustrates a phase change in terms of 2π wrappings, i.e., 2*r* ranging from +180 degrees to −180 degrees shown on the vertical axis of FIG. 8, for the difference in distance from two panels to the UE in millimeters for two different frequencies of transmission. The two different frequencies of transmission in FIG. 8 are 120 GHz and 130 GHz. Also shown in FIG. 8 is a plot of the difference in phase change between 120 GHz and 130 GHz.

Referring again to FIG. 5, the interferometer method may be performed for a reference signal having a frequency of 120 GHz, i.e. λ=2.5 mm. When the distance from the first panel 507*a* to the UE 510 is different from the second panel 507*b* to the UE 5010 by λ, the phase difference is equal to 2π. Therefore, a 27*r* wrapping 810 occurs every 2.5 mm of distance difference at 120 GHz as shown in FIG. 8.

When D=10 m, d=25 cm, a 2π wrapping occurs when the UE moves 100 mm up or down, i.e. direction 520 in FIG. 5. This up or down movement may be referred to as lateral movement with respect to the antenna panels. If the phase difference sensitivity at the base station 505 is 10 degrees, then the accuracy is 2.78 mm.

If the interferometer method is repeated with a reference signal of 130 GHz, i.e. λ=2.3 mm, a 271 wrapping 820 occurs every 2.3 mm of distance difference at 130 GHz as shown in FIG. 8, which maps to 92 mm of lateral movement with respect to the antenna panels.

Taking the difference between the phase differences at 120 GHz and 130 GHz results in a 27*r* wrapping 830 every 3 cm, which refers to the difference in terms of distance from each panel to the UE 510, which is equivalent to 120 cm of lateral movement for the UE.

When D=10 m and d=25 cm, UE lateral movement of approximately 1.2 m with an accuracy of 2.78 mm can therefore be measured and/or determined. The difference between frequencies of the reference signals being used may reduce the ambiguity while the phase difference at one or both frequencies may be used to improve the estimation accuracy.

In some embodiments, the more than two frequencies may be used for expanding the ambiguity range. In some embodiments, using multiple frequencies may be implemented by orthogonal frequency division multiplexing (OFDM) transmission in which different frequency measurements are made using difference OFDM subcarriers.

In some embodiments, the antenna panels are active panels, passive panels, or a hybrid of active and passive panels. An example of active panels are antenna panels that consist of antenna elements connected via phase shifting elements connect to the same LCO. An example of the passive panels may be antenna panels that consist of controllable (or configurable) elements such as a reconfigurable intelligent surfaces (RIS). Hybrid panels are panels that consist of both active and passive panels.

Figure 9:
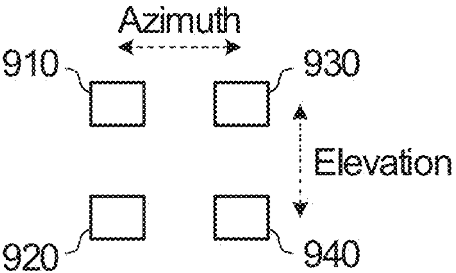
FIG. 9 illustrates an example of how spaced apart panels or panel portions may be used to determine movement in at least two different directions, for example azimuth and elevation, in accordance with embodiments of the present disclosure.

In some embodiments, in order to determine a location or determine movement in various directions, the method according to aspects of the disclosure may be applied in the different directions using multiple panels, or sub-panel portions or a panel, that are aligned along respective directions of movement. For example, panels or sub-panel portions along azimuth and elevation directions may help determine movement in those two directions. FIG. 9 illustrates a two dimensional plane in which four panels 910, 920, 930, and 940 are shown in a 2×2 panel grid. First and second panels 910 and 920 are aligned in FIG. 9 in a vertical direction that may be used to determine movement in the elevation direction. Likewise, third and fourth panels 930 and 940 are aligned in a vertical direction that may be used to determine movement in the elevation direction. First and the third panels 910 and 930 are aligned in FIG. 9 in a horizontal direction that may be used to determine movement in the azimuth direction. Likewise, second and the fourth panels 920 and 940 are aligned in a horizontal direction that may be used to determine movement in the azimuth direction. It is possible to determine movement in two directions with as few as three panels, for example first, second and third panels 910, 920 and 930, but more may be used.

While the description of FIGS. 5 and 6 above has involved the base station transmitting reference signals in the downlink (DL) direction, it is to be understood that similar methods may be employed in the uplink (UL) direction. More specifically, in some embodiments, the UE may send sensing references signals and the base station performs receiver interferometry using different phases between the panels. In such scenarios, as the UE is sending the reference signals and the base station is performing measurements, there is no need for feedback from the UE to the base station of measurement information because the base station both performs the measurements and determines movement of the object, i.e. the UE or an object that the base station measures reference signals from the object that have been reflected by the object. For example, the base station receives the UE signals via two base station panels and over multiple time slots. The phases of the two base station panels may be configured in a similar way to the downlink examples described above. When there is channel reciprocity, the formulation, accuracy and ambiguity ranges are the same for UL and DL. In addition, in UL scenarios, the UE may transmit with a single panel, a single panel partitioned into sub-panels or multiple panels.

Figure 10:
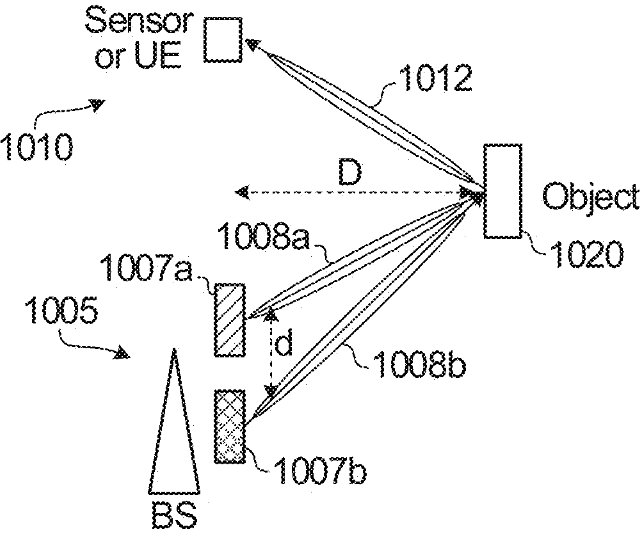
FIG. 10 is a schematic diagram illustrating a network in which two panels at a base station that are spaced apart transmit reference signals toward an object and a UE or sensor detects a reflection of the reference signals off of the object in order to determine movement of the object according to an aspect of the present disclosure.

In some embodiments, an over-the-air (OTA) interferometer may be used to sense object movement. FIG. 10 shows another example of a UE or sensor 1010 being used to measure reflection off of an object 1020. FIG. 10 illustrates a portion of a network that includes a base station 1005 with multiple spaced apart panels 1007*a* and 1007*b*, the object 1020 and the UE or sensor 1010 that uses a single receive beam 1012. The object 1020 is located at distance D in front of the base station 1005. The base station 1005 sends a reference signal in a direction of the object 1020 over multiple time slots. The reference signal is sent from the two panels 1007*a* and 1007*b* with a distance between the panels equal to d, on two beams 1008*a* and 1008*b* that transmit the same signal, but with additional phase shifts for the antenna elements of one panel in each time slot. The UE or sensor 1010 sweeps the receive beam 1012 to detect the reflection off of the object 1020 in each time slot. This is somewhat similar to the arrangement of FIG. 6, except that in FIG. 10, the UE 1010 is only using a single beam, so there is no interferometry used for detecting the reflection off of the object 1020 at the UE in described with FIG. 6.

While FIGS. 6 and 10 illustrate a sensor or UE detecting a reflection off of the object, it should be understood that another base station (not shown) may perform detection of a reference signal reflected off of the object and use measurement information to determine movement of the object or feedback the measurement information to the base station that originally sent the reference signals.

In some embodiments, when the object is large, e.g., the object is larger than a desired resolution, and the object is larger than the ambiguity range, the resolution may be changed by using a different frequency, or using multiple frequencies and considering the difference between measurements at the different frequencies as described above, for the reference signals transmitted by the base station. In some embodiments, changing the panel spacing distance may reduce ambiguity by increasing the ambiguity period. In some embodiments, the UE or sensor may use beam sweeping to measure the movement at one or more edges of the object.

FIGS. 5 and 10 illustrate examples of using interferometry at only the base station in a downlink scenario to detect UE movement and object movement, respectively. The use of multiple frequencies was also described above as an option to address ambiguity and potentially improve accuracy. However, using multiple frequencies requires more using more transmissions or a wideband transmission bandwidth. Another way to address the issue of ambiguity and potentially improve the accuracy is to use interferometry at both the transmitter and the receiver, which may be referred to as double-side interferometry.

Referring back to FIG. 6, the base station 605 and the UE or sensor 610 both use interferometry. In some embodiments, the base station 605 and the UE or sensor 610 have different resolutions based on the different spacings of the panels, or sub-panels, at each device and different frequencies are used for transmission of reference signals by the respective devices. For example, the base station 605 employs transmit interferometry and the UE or sensor 610 employs receive interferometry. Because the base station 605 and UE or sensor 610 have different ambiguity periods due to the different panel spacing and frequencies being used, the overall double-sided interferometer ambiguity is reduced (or the ambiguity period increases), while improving accuracy. As a particular example, for a 4 cm ambiguity period at the base station 610 and 3 cm ambiguity period at the UE or sensor 610, the total ambiguity becomes 12 cm.

Referring again to FIG. 6, the base station 605 and the UE or sensor 610 each have at least two panels, or sub-panel portions, that are connected to a single RF chain. The base station 605 transmits the reference signals over multiple time slots (e.g. 4 slots) and in each time slot, a first panel 607*a* transmits with a constant phase value and the second panel 607*b* transmits with a different phase in each of the multiple time slots.

Figure 11:
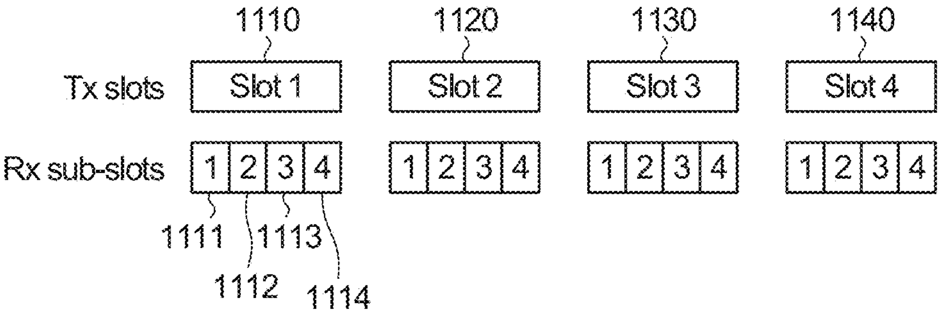
FIG. 11 is a schematic diagram illustrating four transmitter time slots where each transmitter time slot is sub-divided at the receiver into four sub-time slots for use in enabling the receiver to aid in determining movement using interferometry according to an aspect of the present disclosure.

Because the UE or sensor 610 is performing interferometer measurements, each of the multiple time slots in which the base station 605 transmits on the two panels is subdivided into a set of sub-time slots. FIG. 11 illustrates an example of a set of four slots 1110, 1120, 1130 and 1140 that may be used for transmission at the base station 605. In FIG. 11, below each of the four slots 1110, 1120, 1130 and 1140, a set of four sub-time slots are shown. For example, time slot 1110 is shown to span over the same period as sub-time slots 1111, 1112, 1113, and 1114. For each transmission by the base station 605, the UE or sensor 610 may perform interferometer measurements in each of the four sub-time slots. In each sub-time slot, the UE or sensor 610 uses a fixed phase value for a first panel, or first sub-panel portion, for all the four sub-time slots of a given time slot and varies the phase in each of the sub-time slots of the given time slot of the second panel or second sub-panel portion. For example, the UE or sensor 610 adds an additional 0, 0.5π, π, and 1.5π to the second panel or sub-panel portion in the four sub-time slots 1111, 1112, 1113, and 1114, respectively. The UE or sensor 610 may estimate the phase difference ($\phi_r$) of the signal received at the two panels or sub-panel portion of the UE or sensor 610 based on the average of the phases estimated at all time slots. One example of a formula that may to used to perform the estimate is:

$$\phi_r = 0.25\,(\phi_{r1} + \phi_{r2} + \phi_{r3} + \phi_{r4}),$$

where $$\tan\phi_{ri} = \frac{\rho_{4i} - \rho_{2i}}{\rho_{1i} - \rho_{3i}},\ i \in \{1, 2, 3, 4\}$$

where $\phi_{ri}$ is a phase difference of the reference signal received at the two panels of the UE or sensor in time slot i (transmit time slot), $\rho_{ki}$ for $k \in \{1, 2, 3, 4\}$ is an amplitude squared or the strength of the received signal in sub-slot k (received sub-slot) and slot i (transmit time slot). By considering whether the values of $\rho_{4i}-\rho_{2i}$ and $\rho_{1i}-\rho_{3i}$ are positive, negative, or zero, the phase difference $\phi_{ri}$ may be estimated in the range between $-\pi$ and $\pi$.

The UE or sensor 610 may feed back a maximum ratio combining (MRC) value for the measurements at different time slots. For example, the UE or sensor 610 feeds back $\rho_i=\rho_{1i}+\rho_{2i}+\rho_{3i}+\rho_{4i}$ as the measurement feedback of the transmission in time slot i, $i \in \{1, 2, 3, 4\}$.

Based upon the feedback from the UE or sensor 610, the base station estimates the phase difference ($\phi_t$) of the signal sent from the two panels 607*a* and 607*b*. In particular example, the estimate of the phase difference may be obtained from a formula satisfying a relationship:

$$\tan\phi_t = \frac{\rho_4 - \rho_2}{\rho_1 - \rho_3}.$$

By considering whether the values of $\rho_4-\rho_2$ and $\rho_1-\rho_3$ are positive, negative, or zero, the phase difference $\phi_t$ may be estimated in the range between $-\pi$ and $\pi$.

From $\phi_r$ and $\phi_t$, the location or movement of the object may be estimated. For example, the location or movement may be determined by mapping $\phi_r$ and $\phi_t$ to the angles to the object from the base station 605 and/or UE or sensor 610.

If the base station 605 and the UE or sensor 610 are synchronized, angular and radial movement may be detected. This is because both amplitude and phase may be used in order to determine the estimate when synchronized. As a result, movements smaller than a wavelength may be detected. In some embodiments, synchronization may be performed by the network or over-the-air.

In some embodiments, only a single time slot is used by the UE or sensor, (i.e. division of the time slots into sub-time slots is not needed) if the UE or sensor has multiple RF chains because the interferometry may be implemented in the digital domain. For example, phases 0, 0.5$\pi$, $\pi$, and 1.5$\pi$ may be added to a reference signal received at a first RF chain and then the reference signal may be combined with that of a second RF chain for which the phases are not changed, before measuring the amplitude.

In some embodiments, automatic gain control (AGC) at the UE or sensor may be used to maintain suitable output amplitudes for a specific range of input signal amplitudes. As amplitude is a key interferometer measurement, the UE or sensor may consider different behavior of different ACGs. Therefore, the UE or sensor may either use the same ACG for different measurements or consider the differences between different ACGs.

Figure 12:
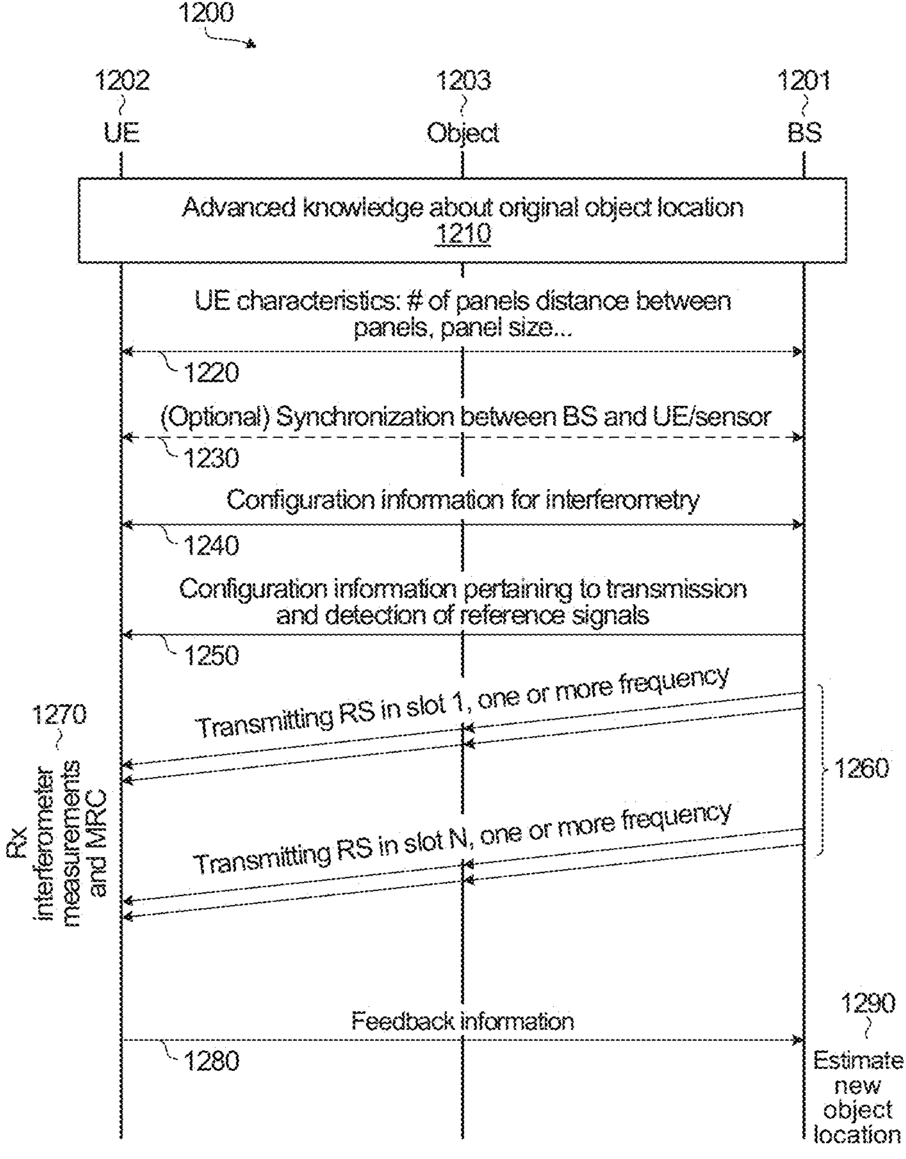
FIG. 12 is an example of a signaling flow diagram for signaling between a base station, a UE, and an object that enables detecting movement of the object using an over-the-air (OTA) interferometer in accordance with embodiments of the present disclosure.

FIG. 12 is a signal flow diagram 1200 that illustrates signaling between a base station (BS) 1201, a UE 1202 and an object 1203 that is being monitored for movement using an OTA interferometer in accordance with embodiments of the present disclosure. While a UE 1202 is specifically referred to, it should be understood that the device identified may be a sensor or some other device configured to perform functionality described below that is performed in the signal flow diagram 1200. The signal flow diagram 1200 illustrates signaling that may occur when both the base station 1201 and the UE 1202 are performing interferometry as shown in FIG. 6.

Initially at step 1210, a primary location of the object is known based on previous determination of the location. For example, the location may be determined by beam sweeping measurement from multiple nodes where the beam direction from multiple nodes helps estimate the object location.

At step 1220, the base station 1201 and the UE 1202, via higher layer signaling (e.g. radio resource control (RRC) signaling), communicate with each other by exchanging information regarding UE characteristics and/or capabilities that may be used to establish the ambiguity and resolution of the double-side interferometer. The information that is exchanged between the base station 1201 and the UE 1202 may pertain to orientation and the physical characteristics of the UE 1202. The information may include one or more of: a number of panels at the UE 1202; panel size, shape, and number of antennas the UE 1202; distance between one or more panels at the UE 1202 in one or more directions; and whether the panels at the UE 1202 are connected to one or more RF chains. The UE may also inform UE or antenna panels orientation with respect to the base station via physical uplink control channel (PUCCH), physical uplink shared channel (PUSCH), or another uplink channel. The orientation of the UE 1202 may be expressed with respect to a reference point or direction (e.g., north), wherein the reference point or direction is known to the base station and/or network the base station is a part of.

In some embodiments, in order to provide synchronization between the base station 1201 and the UE 1202, the base station 1201, or network the base station 1201 is a part of, may optionally send 1230 a synchronization signal to the UE 1202.

Based on the information exchanged in step 1220 and based on a desired accuracy for determining movement, the base station 1201 may determine configuration information for interferometer implementation. The configuration information may include one or more of: which panels are to be used at the base station 1201 and the UE 1202 for interferometry given a specific distance between the panels and how a single panel of at least one of the base station 1201 and the UE 1202 may be divided into sub-panels such that interferometry is applied using the sub-panels. The base station 1201, or network the base station 1201 is a part of, sends 1240 configuration information to the UE 1202 based on the determined information to inform the UE 1202 about the information determined by the base station 1201. In some embodiments, the UE 1202 may select one, two or more panels and then inform the base station 1201 about the number of selected panels, the panel size, and the distance between the panels. Then, the base station 1201, based on the selected panels by the UE 1202, may select which panel to use.

At 1250 the base station 1201, or network the base station 1201 is a part of, sends additional configuration information to the UE 1202 pertaining to transmission of reference signals by the base station 1201 and reception of reference signals by the UE or sensor 1202. The additional configuration information includes one or more of: a number of time slots over which the reference signal may be transmitted and the length of the time slots; an indication of phase values added to one antenna panel or portion of a panel in different time slots, or sub-time slot in comparison to phases of the antennas of other panels or panel portions, an indication of beam-widths of different panels through which the reference signal is transmitted or received, an indication of whether multiple frequency transmission is used and if so, what the frequencies should be; and information pertaining to the feedback the UE 1202 should provide. Examples of the feedback information that the base station 1201 may indicate that the UE 1202 should feedback may include, but is not limited to: an identification of amplitude of received signals in each panel when connected to different RF chains: a phase difference of the reference signals received at different panels; an indication of measurements that should be made by the UE 1202 and fed back (e.g. amplitude or signal strength, received signal strength indicator (RSSI) and reference signal received power (RSRP)) in sub-slots for different time slots; an indication of whether the UE 1202 should perform beam sweeping when the base station 1201 knows the size of the object and/or the primary location of the object. In some embodiments, an indication of the measurements made by the UE 1202 may include an indication that the UE 1202 should perform maximum ratio combining (MRC).

At 1260, the base station 1201, or network the base station 1201 is a part of, sends reference signals in the direction of the object 1203 in which one panel transmits the reference signal with a fixed phase over the various time slots and another panel transmits the reference signal with different phases over the various time slots. The reference signals are reflected or redirected by the object 1203.

The UE 1202 detects 1270 the reflected signals using at least two panels, or a panel that has been virtually portioned into at least two parts, during the sub-time slots within the time slots as described above with regard to FIGS. 6 and 11 and based on configuration information that the UE 1202 has received in steps 1220, 1240 and 1250. The UE 1202 performs receiver (RX) interferometer measurements and generates feedback information, which may include MRC, to send back to the base station 1201 based on configuration information received in step 1250. Other feedback information may include on or more of phase difference for each frequency when multiple frequencies are used, RSSI, and RSRP in each time slot.

At step 1280, the UE 1202 sends the feedback information to the base station 1201.

At step 1290, based on the received feedback information from the UE 1202, the base station 1201 is able to determine the movement of the object or its new location.

While the signaling flow diagram 1200 in FIG. 12 has been described above for the case of the base station 1201 and the UE 1202 both using interferometry and the UE 1202 is detecting signals redirected by an object to determine movement of the object, it is to be understood that the signaling flow diagram 1220 may be similar in many respects for other implementations. Another scenario may be determining movement of the UE itself instead of the object, so the UE is measuring the reference signals directly from the base station instead of signals reflected off of an object. Another scenario may involve the use of multiple frequencies for the reference signals, which may involve step 1260 being performed multiple times, each time for a respective reference signal frequency.

Figure 13:
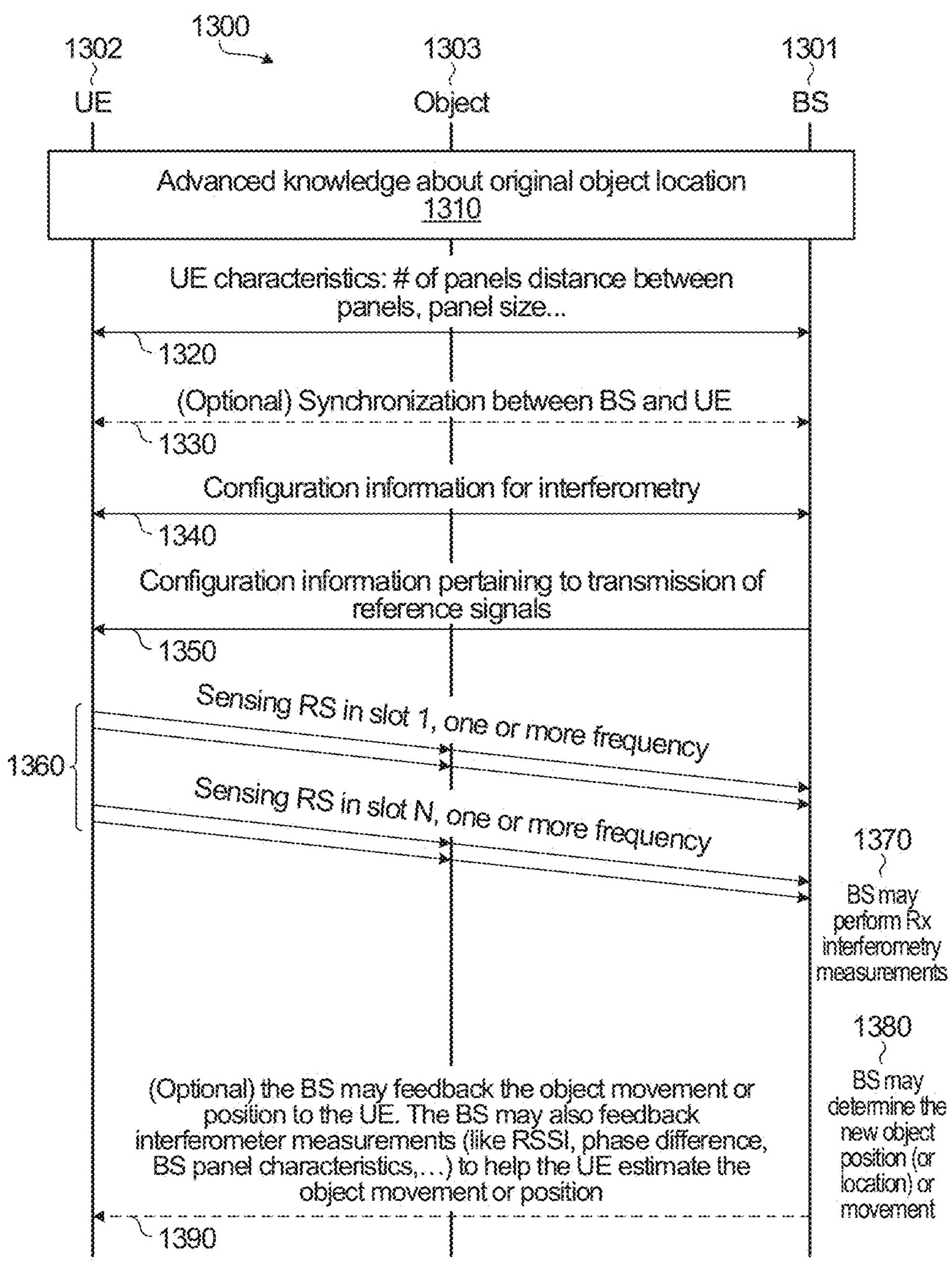
FIG. 13 is another example of a signaling flow diagram for signaling between a base station, a UE, and an object that enables detecting movement of the object using an over-the-air (OTA) interferometer in accordance with embodiments of the present disclosure.

It should be further understood that the UE could transmit reference signals to the base station and the base station could use the measurements it makes to determine movement of the UE or an object that the UE transmitted reference signals are reflected off of. FIG. 13 is a signal flow diagram 1300 that illustrates signaling between a base station 1301, a UE 1302 and an object 1303 that is being monitored for movement using an OTA interferometer in accordance with embodiments of the present disclosure.

Initially at step 1310, a primary location of the object is known based on previous determination of the location. For example, the location may be determined by beam sweeping measurement from multiple nodes where the beam direction from multiple nodes helps estimate the object location.

At step 1320, the base station 1301 and the UE 1302, via higher layer signaling (e.g. radio resource control (RRC) signaling), communicate with each other by exchanging information regarding UE characteristics and/or capabilities that may be used to establish the ambiguity and resolution of the double-side interferometer. The information that is exchanged between the base station 1301 and the UE 1302 may pertain to orientation and the physical characteristics of the UE 1302. The information may include one or more of: a number of panels at the UE 1302; panel size, shape, and number of antennas the UE 1302; distance between one or more panels at the UE 1302 in one or more directions; and whether the panels at the UE 1302 are connected to one or more RF chains. The UE may also inform UE or antenna panels orientation to the base station via physical uplink control channel (PUCCH), physical uplink shared channel (PUSCH), or another uplink channel. The orientation of the UE 1302 may be expressed with respect to a reference point or direction (e.g., north), wherein the reference point or direction is known to the base station and/or network the base station is a part of.

In some embodiments, in order to provide synchronization between the base station 1301 and the UE 1302, the base station 1301, or network the base station 1301 is a part of, may optionally send 1330 a synchronization signal to the UE 1302.

Based on the information exchanged in step 1320 and based on a desired accuracy for determining movement, the base station 1301 may determine configuration information for interferometry implementation. The configuration information may include one or more of: which panels are to be used at the base station 1301 or the UE 1302 for interferometry given a specific distance between the panels and how a single panel of at least one of the base station 1301 and the UE 1302 may be divided into sub-panels such that interferometry is applied using the sub-panels. The base station 1301, or network the base station 1301 is a part of, sends 1340 configuration information to the UE 1302 based on the determined information to inform the UE 1302 about the information determined by the base station 1301. In some embodiments, the base station 1301 may request the UE 1302 to send information to the base station 1301. In some embodiments, the UE 1301 may select one, two or more panels and then informs the base station about the number of selected panels, the panel size, and the distance between the panels. Then, the base station 1301 based on the selected panels by the UE 1302, may select which panel to use.

At 1350 the base station 1301, or network the base station 1301 is a part of, sends additional configuration information to the UE 1302 pertaining to transmission of reference signals by the UE 1302 and reception of reference signals by the base station 1301. The additional configuration information includes one or more of: a number of time slots over which the reference signal may be transmitted and the length of the time slots; an indication of phase values added to one antenna panel or portion of a panel in different time slots, or sub-time slot in comparison to phases of the antennas of other panels or panel portions, an indication of beam-widths of different panels through which the reference is transmitted or received, an indication of whether multiple frequency transmission is used and if so, what the frequencies should be. In some embodiments, the UE 1302 may measure the movement. The base station 1301 may feedback the measurements of RSSI or SNR in each time slot and sub-slots. In such a case, the UE may need to know the number of sub-slots and their durations.

At 1360, the UE 1302 sends reference signals in the direction of the object 1303 in which one panel transmits the reference signal with a fixed phase over the various time slots and another panel transmits the reference signal with different phases over the various time slots. The reference signals are reflected or redirected by the object 1303.

The base station 1301 detects 1370 the reflected signals using at least two panels, or a panel that has been virtually portioned into at least two parts, during the sub-time slots within the time slots. The base station 1301 performs receiver (RX) interferometer measurements.

At step 1380, the base station 1301 determines the location of the objection 1303 based on the measurements the base station has made in step 1370.

At step 1390, the base station 1301 may optionally sends object location information to the UE 1302.

FIG. 13 describes a scenario of double-sided interferometry, i.e. interferometry at both UE 1302 and base station 1301. However, single side interferometry may be used in some implementations. When interferometry is only performed at the base station 1301, the base station 1301 may only ask the UE 1302 to send reference signals in one or more frequencies. The base station 1301 may determine the movement based on interferometry at the base station 1301. When interferometry is only performed at the UE 1302, the same configuration information may be sent to the UE 1302 that is sent for the double-sided interferometry as shown in FIG. 13. This generalization similar applies to FIG. 12.

While FIGS. 12 and 13 are used to describe scenarios for determining movement of an object, it should be understood that similar methods for be used for determining movement of the UE, where instead of the UE monitoring reference signals reflected off of the object for determining movement of the object in FIG. 12 and instead of the base station monitoring reference signals reflected off of the object for determining movement of the object in FIG. 13, the UE may monitor reference signals from the base station for determining movement of the UE in a DL scenario as shown in FIG. 5 and the base station may monitor reference signals from the UE for determining movement of the UE in a UL scenario.

It should be noted that generally, the information determined at the UE, either by measurement or determined based on the measurements may be sent to the base station, or another network equipment, via an uplink control channel such as physical uplink control channel (PUCCH), physical uplink shared channel (PUSCH), or another uplink channel. Examples of information determined by the UE may be one or more of the following: RSs strengths, SNR, RSSI, RSRP, beam index, functions of the RSs strengths, UE angle of arrival (AoA) of the received signal in DL, angle of departure (AoD) of the transmitted signal in UL, UE orientation, UE location.

Information at the base station, which may be either measurements (e.g. reference signal measurements) or determined based on the measurements, may be sent by the base station, or another network equipment, as well as configuration information to a UE through a DL channel such as physical downlink control channel (PDCCH), MAC (media access control or medium access control) signaling, or other DL signaling. Examples of configuration information may be one or more of updated beam directions, beam-width at the UE, selected panels at the UE. Moreover, the base station, or another network equipment, may use radio resource control (RRC) signaling for configuration such as: configuring a UE for reference signaling (e.g. CSI-RS in DL or SRS in UL), interferometer parameters and other configurations for beam directions and beamwidths for different nodes, beam shape, antenna array pattern, number of antennas or panels and other configuration information may be communicated through RRC signaling or UE category information. Examples of interferometer parameters may include indication of reference signals in multiple time-slots, number of sub-slots in double-side interferometer, panel selection at the UE, one panel division, and portions or parts.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the figures or all of the portions schematically shown in the figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method comprising:

receiving, by a user equipment (UE), first configuration information including information pertaining to reference signals used during interferometric measurement;

measuring, by the UE, signal strength of the reference signals in a plurality of time slots based on the first configuration information, wherein a reference signal transmitted from at least a portion of an antenna panel of a base station in each of the plurality of time slots has a different phase value from another reference signal transmitted from at least one other portion of the antenna panel of the base station or a portion of another antenna panel of the base station in each of the plurality of time slots; and sending, by the UE, feedback information based on measurements made during the plurality of time slots.

2. The method of claim 1, further comprising:

communicating, by the UE with the base station, second configuration information including antenna panel information pertaining to at least one of the base station or the UE.

3. The method of claim 2, further comprising:

performing, by the UE, the interferometric measurement of the reference signals in each of the plurality of time slots by performing the measurements on receive beams of the UE over a plurality of sub-time slots in each of the plurality of time slots, wherein the plurality of sub-time slots each has a different phase value for at least a portion of an antenna panel of the UE from at least one other portion of the antenna panel or a portion of another antenna panel of the UE.

4. The method of claim 3, wherein the measuring the signal strength of the reference signals in the plurality of time slots comprises:

partitioning each of the plurality of time slots into the plurality of sub-time slots; and measuring on at least two receive beams of the UE, the signal strength of the reference signals in the plurality of sub-time slots based on at least one of the first configuration information or the second configuration information.

5. The method of claim 3, wherein the first configuration information indicates at least one of:

a number of time slots in the plurality of time slots;

a duration of time slot length;

a number of sub-time slots in the plurality of sub-time slots;

a duration of sub-time slot length;

reference signals of at least two frequencies are used for the interferometric measurement;

the at least two frequencies that are used for the interferometric measurement;

a phase value added to antennas in one panel or panel portion in different time slots and sub-time slots in comparison to phase values of antennas of the other panels or panel portions;

beamwidths of panels through which the reference signal is transmitted or received;

information that the UE is to feedback; or whether beam sweeping is to be used at the UE.

6. The method of claim 1, wherein first reference signals of a first frequency are transmitted and measured at a first time-frequency resource, second reference signals of a second frequency are transmitted and measured at a second time-frequency resource, and a difference of measurements of the first reference signals and the second reference signals is used to reduce ambiguity by increasing an ambiguity period.

7. The method of claim 1, wherein first two antenna panels of the base station or first portions of the first two antenna panels are arranged with respect to one another in a first direction, wherein second two antenna panels of the base station or portions of the second two antenna panels are arranged with respect to one another in a second direction, and wherein the first direction and the second direction are perpendicular to one another to enable determining movement of an object in two directions.

8. A device comprising:

at least one processor; and a computer-readable storage media, having stored thereon, computer executable instructions, that when executed by the at least one processor, cause the device to perform operations including:

receiving first configuration information including information pertaining to reference signals used during interferometric measurement;

measuring signal strength of the reference signals in a plurality of time slots based on the first configuration information, wherein a reference signal transmitted from at least a portion of an antenna panel of a base station in each of the plurality of time slots has a different phase value from another reference signal transmitted from at least one other portion of the antenna panel of the base station or a portion of another antenna panel of the base station in each of the plurality of time slots; and sending feedback information based on measurements made during the plurality of time slots, wherein the device is or is part of a user equipment (UE).

9. The device of claim 8, the operations further comprising:

communicating, with the base station, second configuration information including antenna panel information pertaining to at least one of the base station or the UE.

10. The device of claim 9, the operations further comprising:

performing the interferometric measurement of the reference signals in each of the plurality of time slots by performing the measurements on receive beams of the UE over a plurality of sub-time slots in each of the plurality of time slots, wherein the plurality of sub-time slots each has a different phase value for at least a portion of an antenna panel of the UE from at least one other portion of the antenna panel or a portion of another antenna panel of the UE.

11. The device of claim 10, the measuring the signal strength of the reference signals in the plurality of time slots comprising:

partitioning each of the plurality of time slots into the plurality of sub-time slots; and measuring on at least two receive beams of the UE, the signal strength of the reference signals in the plurality of sub-time slots based on at least one of the first configuration information and the second configuration information.

12. The device of claim 10, wherein the first configuration information indicates at least one of:

a number of time slots in the plurality of time slots;

a duration of time slot length;

a number of sub-time slots in the plurality of sub-time slots;

a duration of sub-time slot length;

reference signals of at least two frequencies are used for the interferometric measurement;

the at least two frequencies that are used for the interferometric measurement;

a phase value added to antennas in one panel or panel portion in different time slots and sub-time slots in comparison to phase values of antennas of the other panels or panel portions;

beamwidths of panels through which the reference signal is transmitted or received;

information that the UE is to feedback; or whether beam sweeping is to be used at the UE.

13. The device of claim 8, wherein first reference signals of a first frequency are transmitted and measured at a first time-frequency resource, second reference signals of a second frequency are transmitted and measured at a second time-frequency resource, and a difference of measurements of the first reference signals and the second reference signals is used to reduce ambiguity by increasing an ambiguity period.

14. The device of claim 8, wherein first two antenna panels of the UE or portions of the first two antenna panels are arranged with respect to one another in a first direction, wherein second two antenna panels or portions of the second two antenna panels are arranged with respect to one another in a second direction, and wherein the first direction and the second direction are perpendicular to one another to enable determining movement of an object in two directions.

15. A method comprising:

transmitting, by a base station, first configuration information including information pertaining to reference signals used during interferometric measurement;

transmitting, by the base station, reference signals in a plurality of time slots based at least in part on the first configuration information, wherein a reference signal transmitted from at least a portion of an antenna panel of the base station in each of the plurality of time slots has a different phase value from another reference signal transmitted from at least one other portion of the antenna panel of the base station or a portion of another antenna panel of the base station in each of the plurality of time slots;

receiving, by the base station, feedback information based on measurements of signal strength of the reference signals in the plurality of time slots based on the first configuration information; and determining, by the base station, an amount of movement of an object based on the feedback information.

16. The method of claim 15, further comprising:

communicating, by the base station with a user equipment (UE), second configuration information including antenna panel information pertaining to at least one of the base station or the UE.

17. The method of claim 15, wherein the feedback information comprises the interferometric measurement of the reference signals in each of the plurality of time slots in which the measurements are made using receive beams of a UE over a plurality of sub-time slots in each of the plurality of time slots, and wherein the plurality of sub-time slots each has a different phase value for at least a portion of an antenna panel than at least one other portion of the antenna panel or a portion of another antenna panel of the UE.

18. A device comprising:

at least one processor; and a computer-readable storage media, having stored thereon, computer executable instructions, that when executed by the at least one processor, cause the device to perform operations including:

transmitting first configuration information including information pertaining to reference signals used during interferometric measurement;

transmitting reference signals in a plurality of time slots based at least in part on the first configuration information, wherein a reference signal transmitted from at least a portion of an antenna panel of a base station in each of the plurality of time slots has a different phase value from another reference signal transmitted from at least one other portion of the antenna panel of the base station or a portion of another antenna panel of the base station in each of the plurality of time slots;

receiving feedback information based on measurements of signal strength of the reference signals in the plurality of time slots based on the first configuration information; and determining an amount of movement of an object based on the feedback information, wherein the device is or is part of the base station.

19. The device of claim 18, the operations further comprising:

communicating second configuration information including antenna panel information pertaining to at least one of the base station or a user equipment (UE).

20. The device of claim 18, wherein the feedback information comprises the interferometric measurement of the reference signals in each of the plurality of time slots in which the measurements are made using receive beams of a UE over a plurality of sub-time slots in each of the plurality of time slots, and wherein the plurality of sub-time slots each has a different phase value for at least a portion of an antenna panel than at least one other portion of the antenna panel or a portion of another antenna panel of the UE.

* * * * *